US012421973B2

United States Patent
McManus et al.

(10) Patent No.: US 12,421,973 B2
(45) Date of Patent: Sep. 23, 2025

(54) SPRING ACTUATED AXIALLY LOCKING SHAFT COUPLING FOR BI-DIRECTIONAL LOADING

(71) Applicant: Halliburton Energy Services, Inc., Houston, TX (US)

(72) Inventors: David McManus, Tulsa, OK (US); Steven Andrew Lovell, Tulsa, OK (US); Casey Laine Newport, Tulsa, OK (US); Andre Joseph Bernier, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/819,700

(22) Filed: Aug. 29, 2024

(65) Prior Publication Data
US 2024/0418176 A1    Dec. 19, 2024

Related U.S. Application Data

(62) Division of application No. 17/731,675, filed on Apr. 28, 2022, now Pat. No. 12,104,613.

(51) Int. Cl.
*F04D 29/044*     (2006.01)
*E21B 17/02*     (2006.01)
(Continued)

(52) U.S. Cl.
CPC .......... *F04D 29/0405* (2013.01); *E21B 17/02* (2013.01); *E21B 43/128* (2013.01);
(Continued)

(58) Field of Classification Search
CPC ...... F04D 13/021; F04D 13/022; F04D 13/08; F04D 13/086; F04D 25/02; F04D 25/022;
(Continued)

(56) References Cited

U.S. PATENT DOCUMENTS

| 3,832,076 A | 8/1974 | Gehrke |
| 5,688,067 A | 11/1997 | Straub |

(Continued)

FOREIGN PATENT DOCUMENTS

| CN | 106704248 A | 5/2017 |
| WO | 2010068833 A2 | 6/2010 |

OTHER PUBLICATIONS

Filing Receipt, Specification and Drawings for U.S. Appl. No. 17/731,675, entitled "Spring Actuated Axially Locking Shaft Coupling for Bi-Directional Loading," filed Apr. 28, 2022, 44 pages.
(Continued)

*Primary Examiner* — Mark A Laurenzi
*Assistant Examiner* — Chirag Jariwala
(74) *Attorney, Agent, or Firm* — Conley Rose, P.C.; Rodney B. Carroll

(57) ABSTRACT

An electrical submersible pump assembly comprising a first section and a second section with an outer housing and a drive shaft. A coupling assembly comprising a coupling, a first and a second locking keys, and a plunger assembly mechanically couples the first drive shaft to the second drive shaft. The coupling is cylindrical in shape with splines configured to transfer torque from the first drive shaft to the second drive shaft. The plunger assembly extends the first and second set of locking keys from a key port in the first shaft and second shaft into a groove within the coupling. The coupling assembly is configured to transfer tensile stress from the first drive shaft to the second drive shaft in response to extending the first locking key in the first groove and the second locking key in the second groove of the coupling.

20 Claims, 6 Drawing Sheets

(51) Int. Cl.
*E21B 43/12* (2006.01)
*F04D 13/10* (2006.01)
*F04D 29/04* (2006.01)
*F16D 1/10* (2006.01)

(52) U.S. Cl.
CPC ........... *F04D 13/10* (2013.01); *F04D 29/044* (2013.01); *F16D 2001/103* (2013.01)

(58) Field of Classification Search
CPC ...... F04D 25/06; F04D 25/0686; F04D 29/04; F04D 29/0405; F04D 29/043; F04D 29/044; F04D 29/05; F04D 29/053; F04D 29/054; F16D 1/10; F16D 1/104; F16D 1/108; F16D 1/112; F16D 1/116; F16D 2001/103; Y10T 403/55; Y10T 403/57; Y10T 403/7032; Y10T 403/7033; Y10T 403/7035
See application file for complete search history.

(56) References Cited

U.S. PATENT DOCUMENTS

| | | |
|---|---|---|
| 6,883,604 B2 | 4/2005 | Mack |
| 7,775,779 B2 | 8/2010 | Sheth |
| 10,907,419 B2 | 2/2021 | Reeves |
| 2002/0179305 A1 | 12/2002 | Mack |
| 2009/0291001 A1 | 11/2009 | Neuroth |
| 2014/0209323 A1 | 7/2014 | Pisetskiy |
| 2020/0072296 A1 | 3/2020 | Mack |
| 2021/0296970 A1 | 9/2021 | Crane |

OTHER PUBLICATIONS

Filing Receipt, Specification and Drawings for U.S. Appl. No. 17/731,680, entitled "Ring Latch Locking Shaft Coupling for Bi-Directional Loading," filed Apr. 28, 2022, 34 pages.

Foreign Communication from Related Application—International Search Report and Written Opinion of the International Searching Authority, International Application No. PCT/US2023/013762, dated Jun. 13, 2023, 9 pages.

Office Action (29 Pages), Sep. 14, 2023, U.S. Appl. No. 17/731,675, filed Apr. 28, 2022.

Foreign Communication from Related Application—International Search Report and Written Opinion of the International Searching Authority, International Application No. PCT/US2023/013759, dated Jun. 12, 2023, 12 pages.

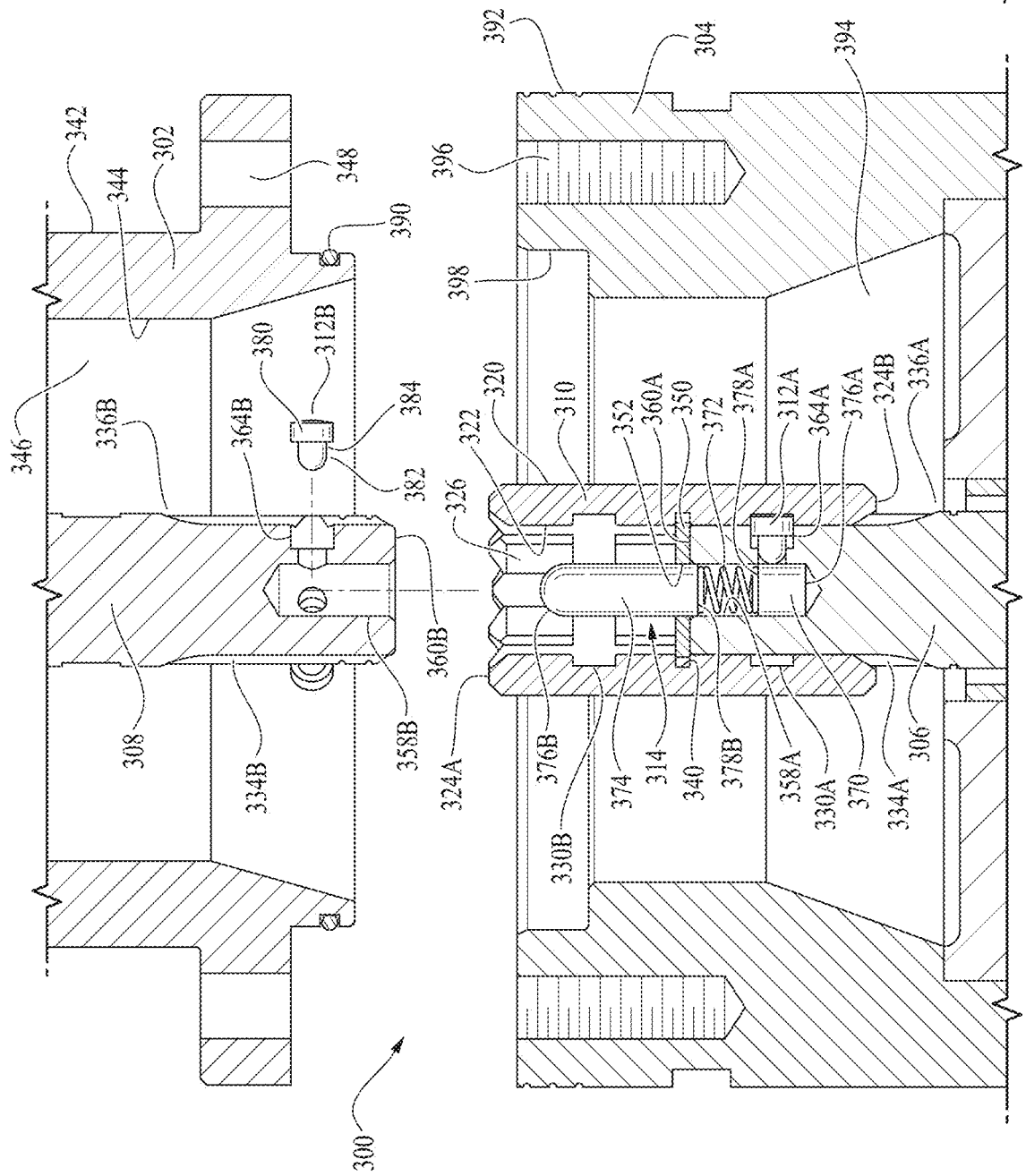

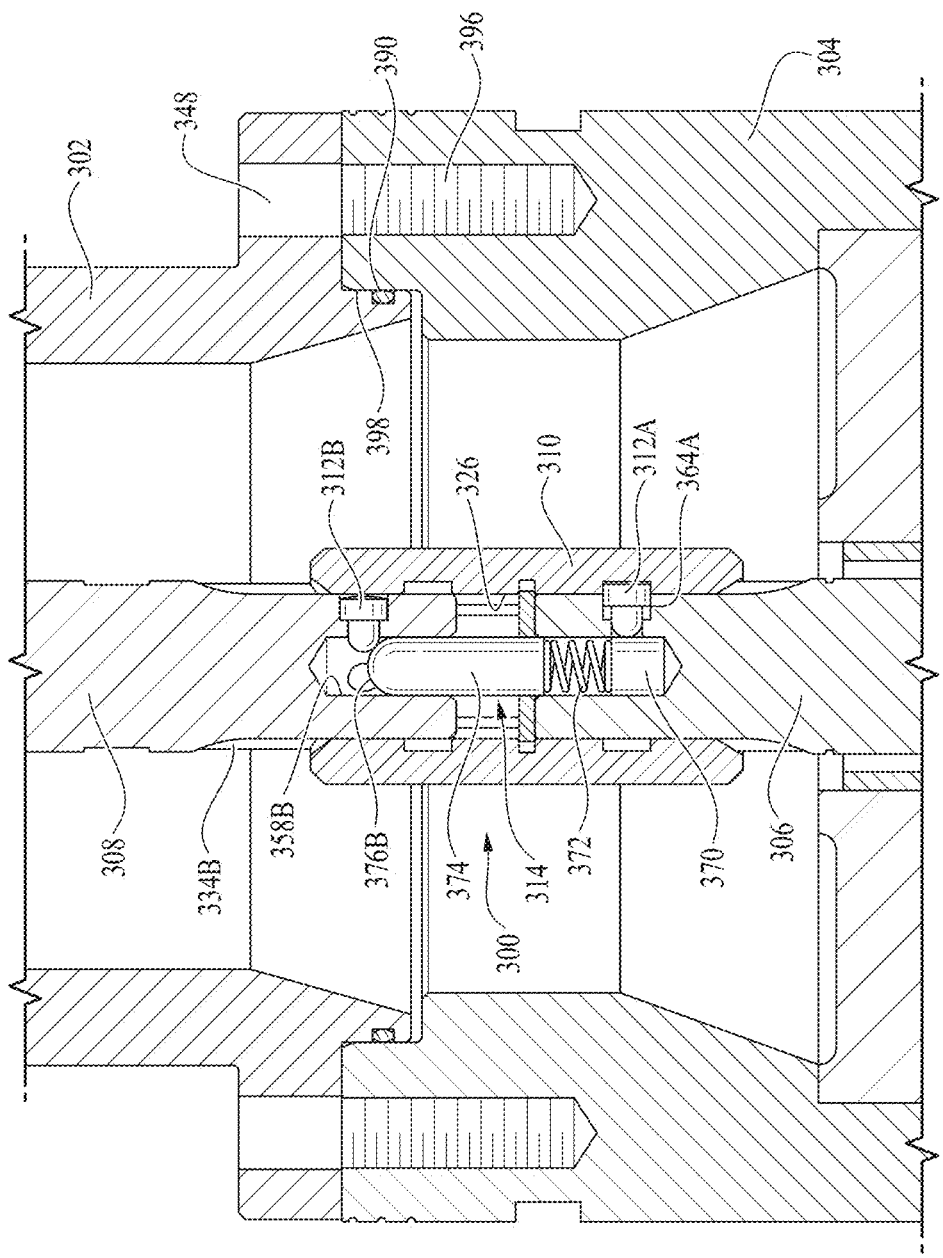

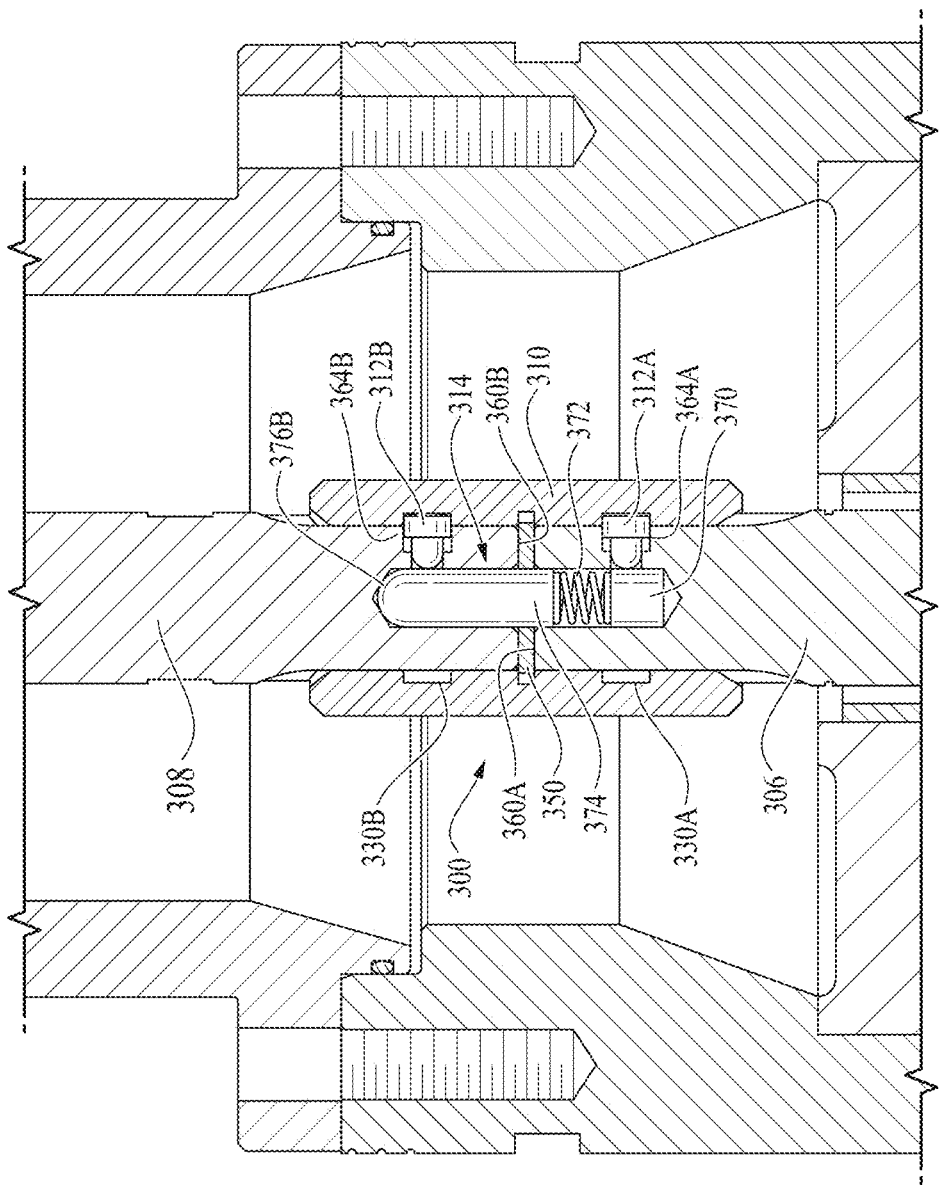

SPRING ACTUATED AXIALLY LOCKING SHAFT COUPLING FOR BI-DIRECTIONAL LOADING

CROSS-REFERENCE TO RELATED APPLICATIONS

The present application is a divisional of and claims priority to U.S. patent application Ser. No. 17/731,675 filed Apr. 28, 2022 and entitled "Spring Actuated Axially Locking Shaft Coupling for Bi-Directional Loading," which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric submersible pump (ESP) systems are typically made from sub-assemblies, also called sections, coupled together in the manufacturing site or at the wellsite. The ESP system may include one or more pump sections, a pump intake, a seal section, and an electrical motor section. Each of these sections includes an outer housing, a mechanical coupling, and an inner shaft. The connections between the sections are interchangeable to allow for various combinations of sections during assembly. The outer housings are mechanically coupled together to withstand compression and tension loading. The inner shafts are connected with typical couplings designed to transmit torque and compressive loading, but not loading in tension. The typical coupling allows for the sections to be coupled together by axially moving sections into contact with each other. The inner shafts slide into the coupling to mate without rotation as the outer housings come into contact with each other. Likewise, the inner shafts can uncouple as the outer housings are separated during disassembly.

The typical type of couplings for the inner shafts can be configured to transmit compressive loading from the pump section to a thrust bearing. The thrust bearing can prevent the axial compressive loading from being transmitted to the motor section and is typically located between the pump section and the motor section. The thrust bearing provides support to the inner shaft to isolate the compressive loading away from the motor section. In some scenarios, the operational characteristics of the ESP system may require the sections to be configured in a manner that results in both tension and compression loading of the inner shaft. For example, when the ESP system is configured to inject fluids into a formation, a second loading, for example a tensile loading, may result from the pump section injecting fluid into the formation. A second thrust bearing may be used to counteract the loading from the inner shaft in the second direction. However, the additional thrust bearing is expensive and may complicate assembly of the ESP system. A method of coupling the inner shafts to transfer tensile and compressive loading is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is partial cross-sectional view of a coupling assembly according to an embodiment of the disclosure.

FIG. 4 is another cross-sectional view of the coupling assembly according to an embodiment of the disclosure.

FIG. 5 is still another cross-sectional view of the coupling assembly according to an embodiment of the disclosure.

DETAILED DESCRIPTION

Figure 1:
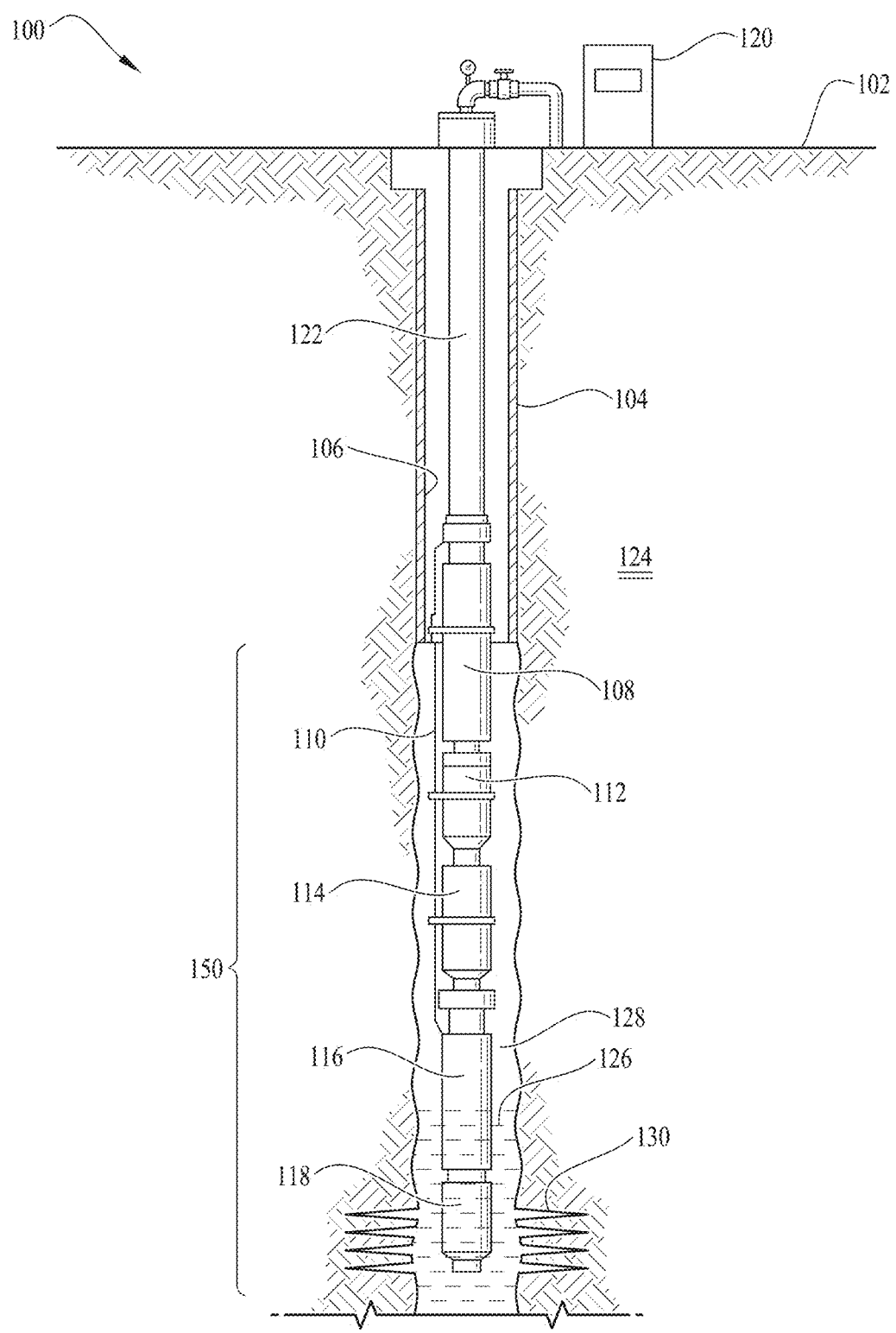
FIG. 1 is an illustration of an electric submersible pump assembly according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" and "downhole" are directed counter to the direction of flow of well fluid, towards the source of well fluid. "Up" and "uphole" are directed in the direction of flow of well fluid, away from the source of well fluid. "Fluidically coupled" means that two or more components have communicating internal passageways through which fluid, if present, can flow. A first component and a second component may be "fluidically coupled" via a third component located between the first component and the second component if the first component has internal passageway(s) that communicates with internal passageway(s) of the third component, and if the same internal passageway(s) of the third component communicates with internal passageway(s) of the second component.

Hydrocarbons, such as oil and gas, are produced or obtained from subterranean reservoir formations that may be located onshore or offshore. The development of subterranean operations and the processes involved in removing hydrocarbons from a subterranean formation typically involve a number of construction steps such as drilling a wellbore at a desired well site, isolating the wellbore with a barrier material, completing the wellbore with various production equipment, treating the wellbore to optimize production of hydrocarbons, and providing surface production equipment for the recovery of hydrocarbons from the wellhead.

During production operations, artificial lift systems (also referred to as production pumps), for example, electric submersible pump (ESP) systems or pumps located at the surface, may be used when reservoir pressure alone is insufficient to produce hydrocarbons from a well or is insufficient to produce the hydrocarbons at a desirable rate from the well. An ESP system is typically transported to the wellsite in sections assembled, attached to the production tubing, and conveyed into the wellbore by the production tubing to a target depth. The typical ESP system is configured with the pump section coupled to the production tubing. This orientation places the pump section above, or uphole, of the motor section.

The assembly of the sections typically include installation of a coupling to the inner shaft of one of the sections. The inner shaft and coupling can include splines to transmit torque from the motor section. The splines on the coupling and shaft can include an allowance fit for sliding engagement. Compression loading can be transferred from an upper shaft to a lower shaft through the face, e.g., end surface, of the shaft. The weight of the pump impellers, rotors, plungers, augers, or other pumping mechanism attached to the inner shaft of the pump section can be transferred downward, or downhole, to the inner shaft of the adjacent section, and eventually, the motor section. During pumping operations, the pump impellers can produce a resultant force in the downhole direction from the pressurization of the production fluids to lift these fluids in the uphole direction, e.g., to surface. A thrust bearing can be attached to an inner shaft to transfer the weight of the pump impellers and the resultant force from the operation of the pump to a bearing face attached to a housing. This thrust bearing can be located in one of the sections to prevent the compression force from being transferred to the motor section.

An ESP system can have multiple configurations that result in bi-directional loading of the shafts. In one scenario, an ESP system can be installed as an injection pump with the pump section below the motor section. In this configuration, the motor section and seal section can be located uphole of the inlet section and pump section. A seal, e.g., a packer, may be installed within the annular space between the outer surface of the pump section and the inner surface of the casing. The seal can direct the fluid within the annular space to flow into or enter the inlet section, to be pressurized, and exit the pump section below the seal. In this scenario, the weight of the drive shafts from the motor section to pump section can place the drive shafts in compression. A thrust bearing within the seal section can isolate the pump section from the compression force of the drive shafts. However, when the pump is in operation, a resultant force from the fluid within the impellers can generate a force in the uphole direction that places the pump drive shaft in compression. A second thrust bearing can be located between the pump section and motor section to isolate the motor section from the resultant force in the uphole direction. However, a second thrust bearing can be an expensive solution and complicate the assembly of the ESP system. A method of isolating the pump section from both forces in the uphole direction and downhole direction is desirable.

In another scenario, an ESP system may be installed on coil tubing to pump fluid from a reservoir to an annular space. An ESP system can be configured with the motor section and seal section located uphole of the pump exit and pump section. The pump section may have a seal, e.g., a packer, within the annular space between the ESP pump assembly and the inner surface of the casing. The seal can direct the fluid within the reservoir to flow into or enter the inlet section, to be pressurized, and exit the pump section above the seal into the annular space. In this scenario, the weight of the drive shafts from the motor section to pump section can place the drive shafts in compression. A thrust bearing within the seal section can isolate the pump section from this compression. However, when the pump is in operation, a resultant force from the fluid within the impellers can generate a force in the downhole direction that places a tensile load on the drive shaft within the seal section and pump section. A second thrust bearing can be installed to protect the pump section from the resultant force in the downhole direction. However, a second thrust bearing can be an expensive solution and complicate the assembly of the ESP system. A method of isolating the pump section from both forces in the uphole direction and downhole direction is desirable.

In a third scenario, an ESP system may be installed as an downhole power source, e.g., an electric generator. An ESP system can be configured with the pump section and seal section uphole of a generator section, e.g., the motor section. The pump section may be coupled to a production tubing with a discharge port located between the pump section and seal section. Injection fluid may be pumped from surface into the production tubing to drive or turn the rotors, e.g., turbines, within the generator section and exit into the wellbore through a discharge section. In this configuration, the weight of the drive shaft from the pump section can be isolated from the motor section by a thrust bearing in the seal section. However, when the generator is operating, a resultant force from the fluid within the impellers can generate a force in the uphole direction that places a compression load on the drive shaft within the seal section and pump section. A second thrust bearing can be installed to protect the pump section from the resultant force in the uphole direction. However, a second thrust bearing can be an expensive solution and complicate the assembly of the ESP system. A method of isolating the pump section from both forces in the uphole direction and downhole direction is desirable.

The present disclosure teaches a locking coupling assembly that overcomes this limitation by providing a locking mechanism configured to transfer tensile force. To protect the motor section from bidirectional forces transmitted along the inner shaft, a locking coupling assembly can be installed between each section of the ESP system. The face of the first shaft may abut or contact the face of the second shaft within the locking coupling assembly. A shaft locking mechanism can mechanically fix the axial distance between the upper and lower shaft inside the locking coupling assembly. Compressive force can be transferred through the face contact of the shafts. Tensile force can be transferred from the upper shaft to the lower shaft through the shaft locking mechanism. The loading through the locking coupling assembly may cycle from tension to compression during the operation of the ESP system. For example, when the ESP system is operating, the compressive force from the resultant force of the impellers within the pump section can be transferred from upper shaft to the lower shaft through the locking coupling assembly to the thrust bearing. In another scenario, when the pumping operation is paused, for example to monitor the reservoir behavior, the weight of the pumping mechanism, e.g., impellers, within the pump section can place the upper and lower shafts in tension. The tensile force is transferred through the locking mechanism of the locking coupling assembly.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

FIG. 1 illustrates a well site environment 100, according to one or more aspects of the present invention. While well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges, and land-based rigs.

In some embodiments, well site environment 100 comprises a wellbore 104 extending from a surface 102 to a permeable formation 124. In some embodiments, the wellbore 104 may comprise a nonconventional, horizontal, deviated, multilateral, or any other type of wellbore. Wellbore 104 may be defined in part by a casing string 106 that may extend from a surface 102 to a selected downhole location. Portions of wellbore 104 that do not comprise the casing string 106 may be referred to as open hole.

In some embodiments, various types of hydrocarbons or fluids may be pumped from wellbore 104 to the surface 102 via the production tubing 122 using an electric submersible pump (ESP) assembly 150 disposed or positioned downhole, for example, within, partially within, or outside casing string 106 of wellbore 104. ESP assembly 150 may comprise various assemblies or sub-assemblies referred to as sections including a pump section 108, an intake section 112, a seal section 114, a motor section 116, and a sensor package 118. In some embodiments, the pump section 108 may comprise one or more centrifugal pump stages, each centrifugal pump stage comprising an impeller mechanically coupled to a drive shaft and a corresponding diffuser held stationary by and retained within the centrifugal pump assembly (e.g., retained by a housing of the centrifugal pump assembly). In some embodiments, the pump section 108 may not contain a centrifugal pump but instead may comprise a rod pump, a piston pump, a progressive cavity pump, or any other suitable pump system or combination thereof.

The pump section 108 may transfer pressure to the production fluid 126 or any other type of downhole fluid to pump or lift the fluid 126 from the downhole reservoir to the surface 102 at a desired or selected pumping rate. In one or more embodiments, fluid 126 may enter the wellbore 104, casing string 106 or both through one or more perforations 130 in the formation 124 and flow uphole to the intake section 112 of the ESP assembly 150. In some embodiments, the intake section 112 includes at least one port or inlet for the production fluid 126 within the wellbore to enter into the ESP assembly 150. The intake section 112 can be fluidically connected to the annulus 128 for the transfer of production fluids 126 to the pump section 108. In some embodiments, the intake section 112 can be configured to intake a production fluid 126 with a mix of liquid and gas, separate the liquid portion, expel the gaseous portion, and transfer the liquid portion to the pump section 108. The centrifugal pump stages within the pump section 108 may transfer pressure to the fluid 126 by adding kinetic energy to the fluid 126 via centrifugal force and converting the kinetic energy to potential energy in the form of pressure. In one or more embodiments, pump section 108 lifts the fluid 126 to the surface 102. In some embodiments, the fluid 126 may be referred to as reservoir fluid.

Figure 2:
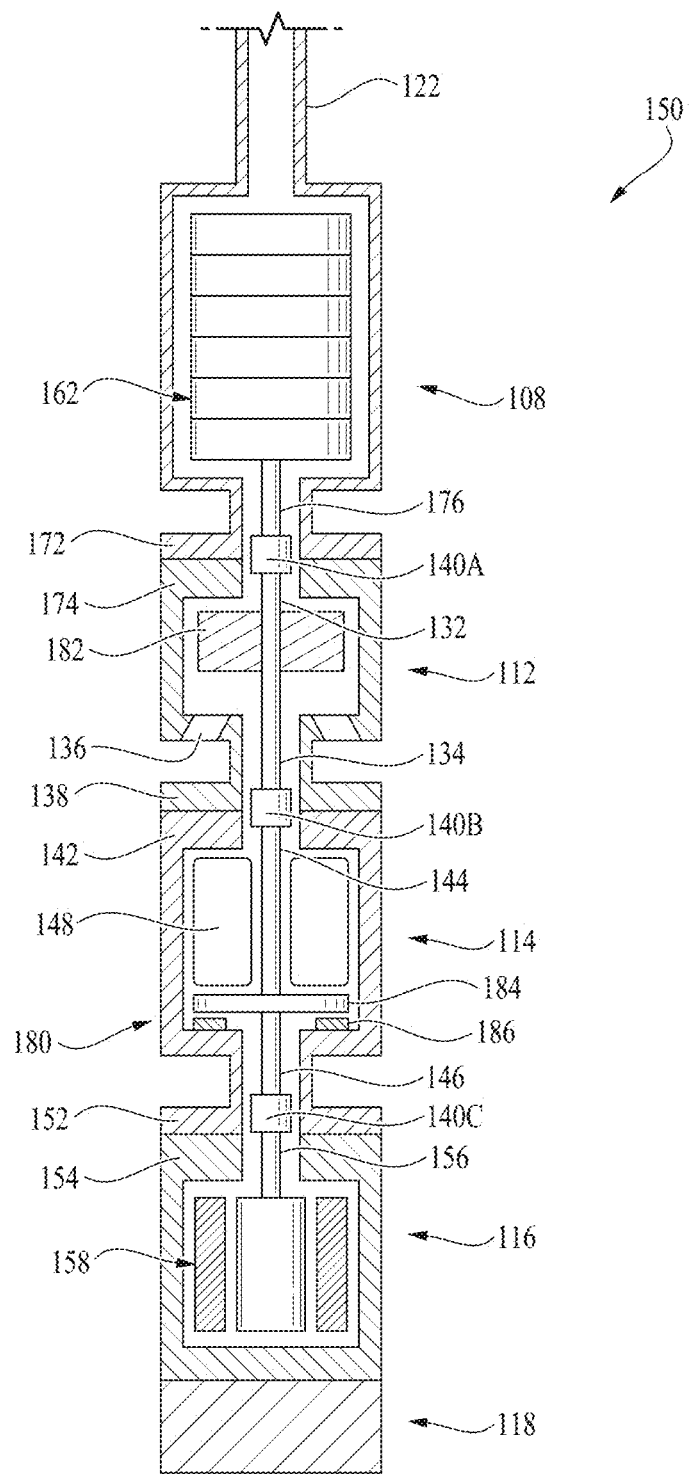
FIG. 2 is a partial cross-sectional view of the electric submersible pump assembly according to an embodiment of the disclosure.

In some embodiments, a motor section 116 can include a drive shaft and an electric motor 158 (see FIG. 2). In some embodiments, an electric cable 110 can be coupled to the electric motor 158 of the motor section 116 and to a controller 120 at the surface 102. The electric cable 110 can provide power and communication to the electric motor 158, transmit one or more control or operation instructions from controller 120 to the electric motor 158, or both. In some embodiments, the electric motor 158 may be a two pole, three phase squirrel cage induction motor or any other electric motor operable or configurable to provide rotational power.

In some embodiments, the rotational power of the motor section 116 can be transferred from the motor section 116 to the pump section 108 via a drive shaft. A drive shaft within the motor section 116 can rotationally couple to a drive shaft within the seal section 114. The drive shaft within the seal section 114 can rotationally couple to a drive shaft within the intake section 112. The drive shaft within the intake section can rotationally couple to the drive shaft within the pump section 108. The rotational power of the motor section 116 can be transferred to the pump section 108 via a plurality of drive shafts rotationally coupled together.

In some embodiments, the ESP assembly 150 can be an injection pump configured to pump various type of injection fluids into the formation 124. The ESP assembly 150 may be disposed downhole proximate the formation 124 and fluidically connected to a volume of fluid located at the surface 102 via the production tubing 122. The pump section 108 may pressurize the injection fluids from the surface 102 (via the production tubing 122) for placement within formation 124. The ESP assembly 150 comprises modular sections, e.g., pump section 108, that can be configured in various combinations. For example, although the ESP assembly 150 is shown configured with the pump section 108 uphole of the motor section 116, it is understood that the ESP assembly 150 can be configured with the motor section 116 above the pump section 108, or any number of combinations. For example, the ESP assembly 150 may be configured with the motor section 116 attached to the production tubing 122, the seal section 114 attached to the motor section 116, the intake section 112 attached to the seal section 114, the pump section 108 attached to the seal section 114, and the sensor package 118 attached to the pump section 108. Configuring the ESP assembly 150 with the pump section 108 below the motor section 116 for the injection of fluids into the formation 124 via the perforations 130 may be advantageous to provide cooling of the motor section 116 via the flow of injection fluids.

In some embodiments, the ESP assembly 150 can be reconfigured for use at the surface. For example, the ESP assembly 150 can be reconfigured as a production pump assembly located at surface 102. For example, the ESP assembly 150 can be reconfigured as a horizontal surface pump assembly configured to pump fluid from the production tubing 122 or into the production tubing 122 via a wellhead. The horizontal surface pump assembly can be fluidically connected to the production tubing 122 via a wellhead. The horizontal surface pump assembly can be located at surface 102 and configured to pump fluid, e.g., salt water, from a volume, e.g., pipeline or storage tank, into the production tubing 122 via the wellhead. In another scenario, the horizontal surface pump assembly can transfer, also referred to as boosting, fluid 126 from the production tubing 122 to another surface facility. The horizontal surface pump configuration (e.g., reconfiguration of the ESP assembly 150) may comprise at least one pump section 108, an intake section 112, a seal section 114 (also called a thrust chamber), and motor section 116. Although the horizontal surface pump configuration may have a different appearance than the downhole configuration of the ESP assembly 150, it is understood that the general description and function of the sections are the same. The horizontal surface pump reconfiguration of ESP assembly 150 may be mounted on a skid or installed within a surface facility.

FIG. 2 is an illustrative representation of the ESP assembly 150 according to some embodiments of the present disclosure. The ESP assembly 150 can be configured with the pump section 108 uphole, e.g., above, the motor section 116. The ESP assembly 150 can couple the pump section 108 to the production tubing 122 and the intake section 112. The bottom flange 172 of the outer housing of the pump section 108 can mechanically couple to the top header 174 of the outer housing of the intake section 112. The pump section 108 can include a lower shaft 176, e.g., a drive shaft, mechanically coupled to the impellers 162 of the centrifugal pump stages.

A first coupling assembly 140A can mechanically couple the drive shafts of two sections, for example, the pump section 108 and the intake section 112. The coupling assembly 140A can include a coupling to rotationally couple the lower shaft 176 of the pump section 108 to the upper shaft 132 of the intake section 112. The drive shaft, e.g., upper shaft 132 and lower shaft 176, can be rotationally coupled to the coupling assembly 140A with splines. The coupling assembly 140A can transmit the axial forces of tension and compression from a first drive shaft to a second drive shaft, e.g., upper shaft 132 and lower shaft 176, as will be described hereinafter.

The intake section 112 can include an upper shaft 132, a lower shaft 134, and an intake port 136. In some embodiments, the intake section 112 can include a gas separator mechanism 182 that may be mechanically coupled to the drive shaft or may not be coupled to the drive shaft. In some embodiments, the drive shaft, e.g., the upper shaft 132 and lower shaft 134, may be coupled or may be a unitary construction. The bottom flange 138 of the outer housing of the intake section 112 can mechanically couple to the top header 142 of the outer housing of the seal section 114.

A second coupling assembly 140B may mechanically couple the drive shaft of the intake section 112 to a drive shaft of the seal section 114. The second coupling assembly 140B may be similar to the first coupling assembly 140A and may transfer axial forces of tension and compression. The seal section 114 can include a drive shaft, e.g., an upper shaft 144 and a lower shaft 146, and a seal mechanism 148. The seal mechanism 148 comprises a shaft seal, a bag seal, a labyrinth seal, or combinations thereof. In some embodiments, the seal section 114 can include a thrust bearing mechanism 180 comprising a dynamic bearing 184 mechanically coupled to the shaft and a static bearing 186 coupled to the housing. In some embodiments, the upper shaft 144 and lower shaft 146 may be coupled or may be a unitary construction. The bottom flange 152 of the outer housing of the seal section 114 can mechanically couple to the top header 154 of the outer housing of the motor section 116.

A third coupling assembly 140C may rotationally couple the drive shaft of the seal section 114 to the drive shaft of the motor section 116. The third coupling assembly 140C may be similar to the second coupling assembly 140B and may transfer axial forces of tension and compression. The motor section 116 can comprise an upper shaft 156, e.g., the drive shaft, and an electric motor 158. The third coupling assembly 140C may rotationally couple the lower shaft 146 of the seal section 114 to an upper shaft 156 of the motor section 116. The electric motor 158 may be coupled to a downhole sensor, for example within the sensor package 118.

In operation, the upper shaft 156 of the motor section 116 may transmit or communicate the torque of the electric motor 158 to the lower shaft 146 of the seal section 114, from the upper shaft 144 of the seal section to the lower shaft 134 of the intake section 112, and from the upper shaft 132 of the intake section 112 to the lower shaft 176 of the pump section 108. The lower shaft 176, e.g., the drive shaft, of the pump section 108 can provide rotational torque and power to one or more fluid movers, impellers, centrifuge rotors, pump rods, or augers of the pump section 108. The electric motor 158 may be rotationally coupled to the drive shaft of the seal section 114 by a third coupling assembly 140C. The drive shaft of the seal section 114 may be rotationally coupled to the intake section 112 by a second coupling assembly 140B. The drive shaft of the intake section 112 may be rotationally coupled to the pump section 108 by a first coupling assembly 140A.

The coupling assembly 140 may transfer axial loading from a first drive shaft to a second drive shaft. For example, as shown in FIG. 2, the coupling assembly 140C can transfer axial tension from the thrust bearing mechanism 180 to the electric motor 158. The weight of the internal components of the electric motor 158, e.g., rotors, may be transferred from the upper shaft 156 of the motor section 116 to the lower shaft 146 of the seal section 114 via the coupling assembly 140C. The weight of the internal components of the electric motor 158 can be transferred from the dynamic bearing 184 attached to the drive shaft to the static bearing 186 of the thrust bearing mechanism 180. In some embodiments, the ESP assembly 150 may be configured as an injection pump with the pump section 108 located below the thrust bearing mechanism 180. The pump section 108 may produce an additional tensile load transferred via the coupling assembly 140, in the form of a resultant force, from the transfer of mechanical energy from the impellers 162 to pressurize the fluid.

In another scenario, the coupling assembly 140 may transfer axial compression from one drive shaft to another. For example, the weight of the impellers 162 coupled to the drive shaft of the pump section 108 may be transferred to the dynamic bearing 184 of the thrust bearing mechanism 180 via the coupling assembly 140A, the drive shaft of the intake section 112, the coupling assembly 140B, and the drive shaft of the seal section 114. During pumping operations, the impellers 162 may produce an additional compressive load, or a resultant force, due to the transfer of mechanical energy from the impellers 162 to pressurize the fluid 126.

Although the ESP assembly 150 is illustrated with the pump section 108 above the motor section 116, it is understood that the sections may be assembled in any order. For example, the motor section 116 may be uphole of the pump section 108.

Turning now to FIG. 3, an embodiment of the coupling assembly 140 is illustrated. For example, FIG. 3 is a partial cross-sectional view of an exemplary coupling assembly 300 of the ESP assembly 150, according to one or more embodiments of the present disclosure. The coupling assembly 300 may couple a first shaft of a first section to a second shaft of a second section of the ESP assembly 150. It is understood that the coupling assembly 300 is exemplary of the mechanical coupling between any two of the sections, for example, the coupling assembly 300 can connect the drive shaft of the motor section 116 to the drive shaft of the seal section 114, the drive shaft of the intake section 112 to the drive shaft of the pump section 108, or combination thereof. It is understood that although one of each section is listed, the coupling assembly 300 can connect two or more of the same section, for example a first pump section to a second pump section, e.g., pump section 108.

The coupling assembly 300 can include similar features, as shown in FIG. 2, such as a first shaft, e.g., a lower shaft 176, a second shaft, e.g., an upper shaft 132, and a coupling assembly, e.g., coupling assembly 140A. As illustrated in FIG. 3, the coupling assembly 300 comprises a first shaft 306, a second shaft 308, a coupling 310, a first set of locking keys 312A, a second set of locking keys 312B, and a plunger assembly 314. The coupling 310 may be cylindrical in shape with an outer surface 320, an inner surface 322, an upper end surface 324A, and a lower end surface 324B. The coupling 310 may include splines 326, e.g., longitudinal teeth and grooves, a first groove 330A, and a second groove 330B formed along the inner surface 322. Splines are generally described as external teeth or internal teeth formed with a radial series of grooves cut or broached in a longitudinal direction on the outer surface of the shaft or the inner surface of the coupling. The coupling 310 includes a plate groove 340 located within the inner surface 322 proximate to the middle of the coupling 310 or half the axial distance measured from the upper end surface 324A to the lower end surface 324B. A coupling plate 350, generally shaped as a washer, e.g., a thin round plate with a port 352, can be installed within the plate groove 340.

The first shaft 306 and second shaft 308 can be generally cylindrical in shape with splines, splines 334A, 334B, formed on the outer surface 336A, 336B. The first shaft 306 and second shaft 308 can include similar features that mirror one another. The first shaft 306 includes a plunger bore 358A extending longitudinally along an axis from the end surface 360A. The plurality of key ports 364A formed in a radial direction from the outer surface 336A can be spaced angularly about the longitudinal axis of the mandrel, e.g., first shaft 306. The key ports 364A may include a step defined by a smaller diameter port within a larger diameter port. The first shaft 306 may have 1, 2, 3, 4, 5, or any number of key ports 364A evenly distributed or unevenly distributed about the circumference of the outer surface 336A. The second shaft 308 may have similar features labeled with "B", for example, end surface 360B.

The plunger assembly 314 comprises a first plunger 370, a plunger spring 372, and a second plunger 374. The first plunger 370 and second plunger 374 can be generally rod shaped with a tapered end 376 and a flat end 378. The plunger spring 372, e.g., a compression spring, can be free floating or can be attached at the flat end 378 of the first plunger 370, the second plunger 374, or both plungers. The plunger assembly 314 can be configured for a first position, e.g., a contacted position, wherein the plunger spring 372 has a high level of spring stress from the second plunger 374 moving proximate to the first plunger 370. The plunger assembly 314 can be configured for a second position, e.g., an expanded position, wherein the plunger spring 372 has a low level of spring stress and the second plunger 374 is at a greater distance from the first plunger 370 than the first position. Although the second plunger 374 is shown longer than the first plunger 370, it is understood that the second plunger 374 may be the same length or shorter than the first plunger 370.

The locking keys 312 can be generally rod shaped with a cap end 380 and a tapered surface 382. The cap end 380 can be a larger diameter than the tapered surface 382 with a shoulder surface 384 between the two diameters. The first set of locking keys 312A can be installed into the key ports 364A on the first shaft 306. The second set of locking keys 312B can be installed into the key ports 364B on the second shaft 308.

The outer housing of a first section can include a bottom flange, e.g., bottom flange 302. The bottom flange 302 can be generally cylindrical in shape with an outer surface 342, an inner surface 344, and an inner chamber 346. The bottom flange 302 can include a plurality of anchor ports 348 and a seal 390. The bottom flange 302 may be any of the bottom flanges illustrated in FIG. 2, for example, bottom flange 172. The outer housing of a second section can include a top header, e.g., top header 304. The top header 304 can be a generally cylindrical shape with an outer surface 392, an inner surface, and an inner chamber 394. The top header 304 can also include a plurality of anchor ports 336 and a seal surface 398. The top header 304 may be any of the top headers illustrated in FIG. 2, for example, top header 174.

The assembly of the ESP assembly 150 (as shown in FIG. 2) can be performed at a remote wellsite. The ESP assembly 150 may be transported to the remote wellsite as separate sections, e.g., the pump section 108. The assembly of the ESP assembly 150 can begin with the lower most portion or the portion to enter wellbore first, for example, the sensor package 118 can be attached or assembled to the motor section 116. The seal section 114 can be attached or coupled to the portion comprising the motor section 116 and the sensor package 118. As previously described, the bottom flange 152 of the outer housing of the intake section 112 can mechanically couple to the top header 154 of the outer housing of the motor section 116. The upper shaft 156 of the motor section 116 can be mechanically coupled to the lower shaft 146 of the seal section 114 with the coupling assembly 140C as will be described hereinafter. Although the assembly of the ESP assembly 150 as shown in FIG. 2 is described, it is understood that the sections of the ESP assembly 150 are modular and may be assembled in another order or sequence for different type of ESP assembly, e.g., an injection pump.

The process of coupling an first shaft of a first section to a second shaft of a second section with a coupling assembly, e.g., 140C, can be described with the embodiment of the coupling assembly 300. The process of coupling the coupling assembly 300 is illustrated in FIG. 3, and FIG. 4 and described herein. Returning to FIG. 3, the alignment process can begin with shifting the axial position of each shaft to a first position. The first shaft 306 and/or the second shaft 308 may be moved, or shifted axially, to a first position away from each other to maximize the gap or distance between the second shaft 308 and first shaft 306. The amount of axial movement may be limited by the mechanisms coupled to each shaft. For example, the movement of the pump shaft, e.g., shaft 176 in FIG. 2, may be limited by the impellers 162 coupled to the pump shaft. Each shaft, e.g., second shaft 308, may have a first position, e.g., an upper axial position, and a second position, e.g., a lower axial position, during the assembly process. For example, the first shaft 306 may be positioned in a first position, e.g., an upper axial position, and the second shaft 308 may be positioned in a first position, e.g., a lower axial position, to create a gap or a predetermined distance between the end surfaces of each shaft.

The first set of locking keys 312A can be installed within the key ports 364A on the first shaft 306. The coupling 310, with the coupling plate 350 pre-installed, can be coupled to the first shaft 306 by aligning the splines 326 of the coupling 310 with the splines 334A of the first shaft 306. The coupling 310 can slidingly engage the first shaft 306 until the coupling plate 350 contacts the end surface 360A. The plunger assembly 314 can be installed within the plunger bore 358 (through the port 352) with the first plunger 370 inserted into the plunger bore 358 first. The tapered end 376A of the first plunger 370 can urge the first set of locking keys 312A from a first position, e.g., retracted, to a second position, e.g., extended, to move into the first groove 330A within the coupling 310. The outer surface of the first plunger 370 can contact the tapered surface 382 of the locking keys 312 to retain the first set of locking keys 312A in the extended position.

Turning now to FIG. 4, the mechanical coupling of the first section to the second with the coupling assembly 300 can be illustrated. In some embodiments, the coupling 310 can be aligned for installation onto the second shaft 308 by turning the second shaft 308 to align the splines 334B with the splines 326 of the coupling 310 as the first and second sections are brought together. The second plunger 374 of the plunger assembly 314 can enter the plunger bore 358B of the second shaft 308. The plunger spring 372 can compress as the taper 375B of the second plunger 374 contacts and presses against the second set of locking keys 312B. The second set of locking keys 312B can be held in a down position, e.g., retracted, by the inner surface 322 of the coupling 310. The outer housings of each section can be coupled by moving the bottom surface of the bottom flange 302 into contact with the end surface of the top header 304. The seal 390 of the bottom flange 302 can fluidically seal to the seal surface 398 of the top header 304. The plurality of anchor ports 348 in the bottom flange 302 can be aligned with the corresponding anchor ports 336 on the top header 304 and a suitable fastener, e.g., a bolt, (not shown) can be installed.

Turning now to FIG. 5, the assembly of the coupling assembly 300 can be completed by urging the shafts together. The second shaft 308 of the second section and the first shaft 306 of the first section can be urged together, or towards the opposite shaft, by shifting axially from a first position to a second position wherein the end surface 360A and end surface 360B are contacting the coupling plate 350. The second set of locking keys 312B will retain in the first position, e.g., retracted position, as the first shaft 306 and the second shaft 308 are urged together. The locking keys 312B will move from the first position to the second position, e.g., locked position, when the second groove 330B on the coupling 310 aligns with the locking keys 312B. The plunger spring 372 on the plunger assembly 314 can bias the second plunger 374 forward to move the locking keys 312B to the locked position with the tapered end 376B. The outer surface of the second plunger 374 retains the locking keys 312B in the locked position.

Although the coupling assembly 300 is described in one orientation, it is understood that the coupling assembly 300 may be configured in the opposite orientation. For example, the coupling 310 can be installed on the second shaft 308 first. The plunger assembly 374 can be installed with the second plunger 374 installed first or with the first plunger 370 installed before the second plunger 374. Likewise, with an ESP assembly reconfigured as a horizontal surface pump assembly, the installation can begin with the coupling 310 installed on the drive shaft oriented towards the motor section or installed on the drive shaft oriented away from the motor section.

In some embodiments, a compression force can be transferred from a first shaft 306 to the opposite shaft, e.g., the second shaft 308, via the coupling assembly 300. A compression force or force directed towards the opposite shaft, can be transferred from the end surface 360A of the first shaft 306 through the coupling plate 350 to the end surface 360B of the second shaft 308. The compression force does not stress the coupling 310 as the grooves 330A, 330B on the coupling 310 are aligned, or coincidental, with the locking keys 312A, 312B.

In some embodiments, a tensile force can be transferred from a first shaft 306 to the opposite shaft, e.g., second shaft 308, via the coupling assembly 300. A tensile force, or force directed away from the opposite shaft, can be transferred from the first shaft 306 to the second shaft 308 via the locking keys 312A, 312B positioned within the grooves 330A, 330B of the coupling 310. For example, a tensile force in the first shaft 306 can be transferred to the first set of locking keys 312A via the key ports 364A, to the first groove 330A in the coupling 310, to the second set of locking keys 312B via the second groove 330B, to the second shaft 308 via the key ports 364B. Although the tensile force is described as originating with the first shaft 306, it is understood that the tensile force may be generated from the second shaft 308.

Figures 6A, 6B:
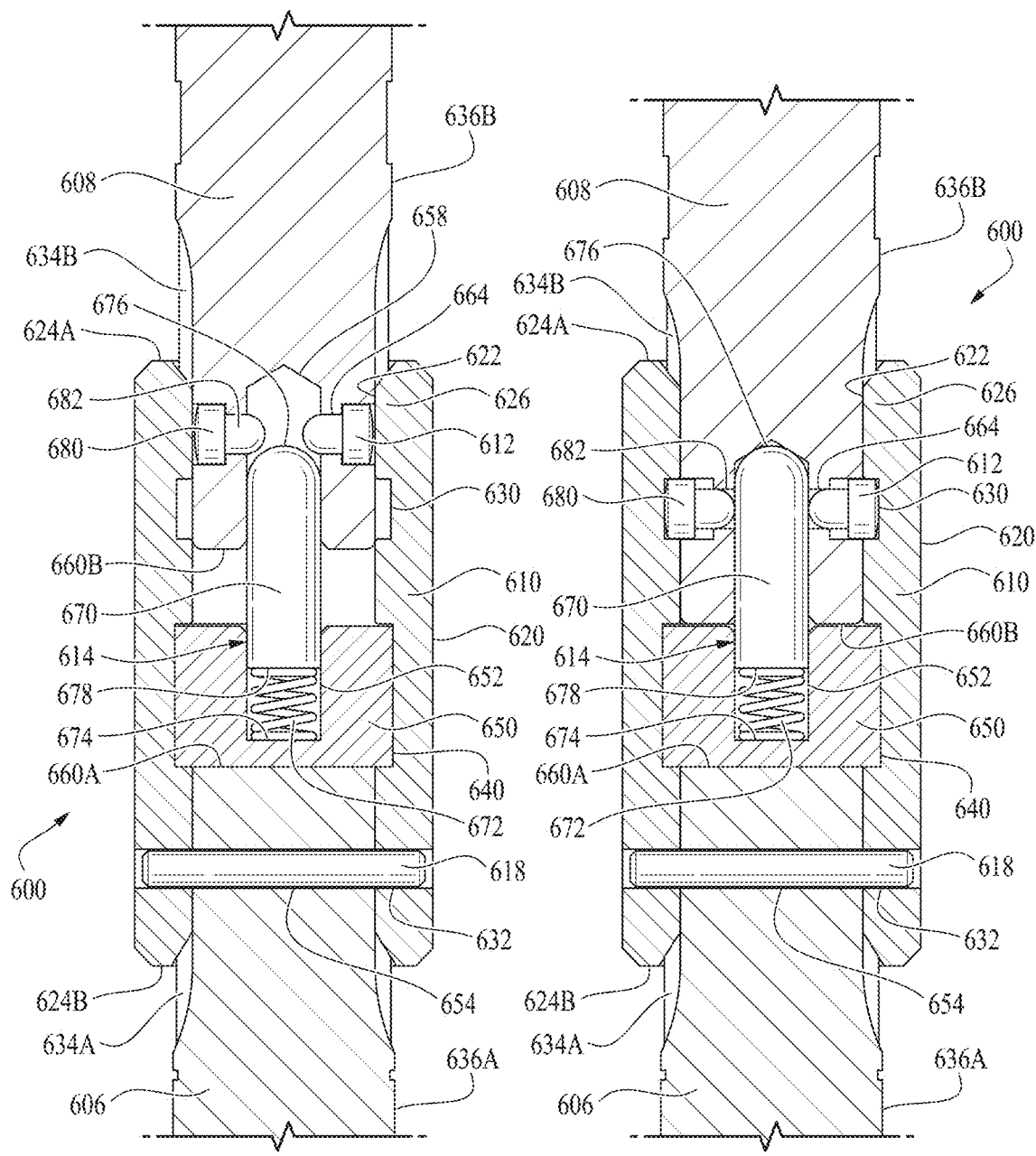
FIGS. 6A and 6B are cross-sectional views of the assembly of the coupling assembly according to another embodiment of the disclosure.

Turning now to FIG. 6A, another embodiment of the coupling assembly 140 is illustrated. For example, FIG. 6A is a partial cross-sectional view of an exemplary coupling assembly 600 of the ESP assembly 150, according to one or more embodiments of the present disclosure. The coupling assembly 600 may couple a first drive shaft of a first section to a second drive shaft of a second section of the ESP assembly 150. It is understood that the coupling assembly 600 is exemplary of the mechanical coupling between any two of the sections. As previously described, it is understood that each embodiment of the coupling assembly can couple multiple sections and/or can connect two or more of the same section, for example a first pump section to a second pump section, e.g., pump section 108.

The coupling assembly 600 can include similar features, as shown in FIG. 2, such as a first drive shaft, e.g., a lower shaft 176, a second drive shaft, e.g., an upper shaft 132, and a coupling assembly, e.g., coupling assembly 140A. As illustrated in FIG. 6A, the coupling assembly 600 comprises a first shaft 606 (a first drive shaft), a second shaft 608 (a second drive shaft), a coupling 610, a set of locking keys 612, a plunger assembly 614, and a release device 618. The coupling 610 may be similar to the coupling 310 of FIG. 3 with an outer surface 620, an inner surface 622, an upper end surface 624A, and a lower end surface 624B. The coupling 610 may include splines 626, a groove 630, and a pin port 632. The coupling 610 includes a support groove 640 located within the inner surface 622 proximate to the middle of the coupling 610. A support ring 650, generally cylinder shape with a plunger bore 652, can be coupled within the support groove 640.

The first shaft 606 and second shaft 608 can be similar to shafts 306, 308 (referring to FIG. 3) with splines 634A, 634B formed on the outer surface 636A, 636B. The first shaft 606 includes a pin port 654. The pin port 654 of the shaft can align with the pin port 632 of the coupling 610. The release device 618 can be installed into the pin bore 694 of the first shaft 606 and pin port 632 of the coupling 610. The release device 618 may be a shear pin in the form of a rod shaped pin, threaded screw, rolled pin, or other geometric shape. The release device 618 may be made from a brass, a stainless steel, or any other commonly used shearable material suitable for the wellbore environmental conditions.

The second shaft 608 includes a plurality of key ports 664 similar to the key ports 364A of FIG. 3. The plurality of key ports 664 can be formed in a radial direction from the outer surface 636B and spaced angularly about the longitudinal axis of the shaft, e.g., second shaft 608. The key ports 664 may include a step defined by a smaller diameter port within a larger diameter port. The second shaft 608 may have 1, 2, 3, 4, 5, or any number of key ports 664 evenly distributed or unevenly distributed about the circumference.

The plunger assembly 614 comprises a plunger 670 and a plunger spring 672 located within a plunger bore 652 of the support ring 650. The plunger 670 can be generally rod shaped with a tapered end 676 and an end surface 678. The plunger spring 672, e.g., a compression spring, can be free floating or can be attached at the end surface 678 of the plunger 670. The plunger assembly 614 can be configured for a first position, e.g., a contacted position, wherein the plunger spring 672 has a high level of spring stress from the plunger 670 moving proximate the end surface 674 of the plunger bore 652. The plunger assembly 614 can be configured for a second position, e.g., an expanded position as shown in FIG. 6B, wherein the plunger spring 672 has a low level of spring stress and the end surface 678 of the plunger 670 is located a greater distance from the end surface 674 of the plunger bore 652 than the first position.

The locking keys 612 can be generally rod shaped with a cap end 680 and a tapered surface 682. The locking keys 612 can be similar to the locking keys 312 of FIG. 3. The set of locking keys 612 can be installed into the key ports 664 on the second shaft 608.

The process of coupling the coupling assembly 600 can follow the same process described in FIG. 3, and FIG. 4. The set of locking keys 612 can be installed within the key ports 364 on the second shaft 308. The coupling 610 with the support ring 650 can be coupled to the first shaft 606 by aligning the splines 626 of the coupling 610 with the splines 634A of the first shaft 606. The coupling 610 can slidingly engage the first shaft 606 until the support ring 650 contacts the end surface 660A. The release device 618 can be installed through the aligned pin port 632 of the coupling 610 and the pin port 654 of the first shaft 606. The plunger assembly 614 can be installed within the plunger bore 652 with the plunger spring 672 inserted first followed by the first plunger 370.

In some embodiments, as the second shaft 608 and first shaft 606 are urged together, the set of locking keys 612 are held in a first position, e.g., retracted position by the inner surface 622 of the coupling 610. The plunger 670 can enter the plunger bore 658 of the second shaft 608. The tapered surface 682 of the set of locking keys 612 can contact the tapered end 676 of the plunger 670 to move the plunger 670 towards the support ring 650 as the first shaft 606 and second shaft 608 are urged together. The plunger spring 672 can be compressed as the end surface 678 of the plunger 670 moves towards the end surface 674 of the plunger bore 652. The compression of the plunger spring 672 can generate an elevated level of spring stress and thus bias the plunger 670 away from the end surface 674 and towards the end of the plunger bore 658 on the second shaft 608.

Turning now to FIG. 6B, in some embodiments the set of locking keys 612 can move from the first position to a second position, e.g., a locked position, when the groove 630 on the coupling 610 aligns with the locking keys 612. The groove 630 on the coupling 610 can align with the key port 664 on the second shaft 608 as the end surface 660B of the second shaft 608 abuts the support ring 650. The plunger spring 672 can bias the plunger 670 to move the locking keys 612 to the locked position. The outer surface of the plunger 670 retains the locking keys 312B in the locked position.

Although the coupling assembly 600 is described in one orientation, it is understood that the coupling assembly 600 may be configured in the opposite orientation. For example, the coupling 610 can be installed on the second shaft 608 with the pin port 654 located on the second shaft 608. Likewise, with a horizontal configuration of a production pump, the installation can begin with the coupling 610 installed on the drive shaft oriented towards the motor section or installed on the drive shaft oriented away from the motor section.

In some embodiments, a compression force can be transferred from a first shaft 606 to the opposite shaft, e.g., the second shaft 608, via the coupling assembly 600. A compression force or force directed towards the opposite shaft, can be transferred from the end surface 660A of the first shaft 606 through the support ring 650 to the end surface 660B of the second shaft 608. The compression force does not stress the coupling 610 as the groove 630 on the coupling 610 can be aligned, or coincidental, with the locking keys 612.

In some embodiments, a tensile force can be transferred from a first shaft 606 to the opposite shaft, e.g., second shaft 608, via the coupling assembly 600. A tensile force, or force directed away from the opposite shaft, can be transferred from the first shaft 606 to the second shaft 608 via the locking keys 612 positioned within the groove 630 and the release device 618 located within the pin port 632 of the coupling 610. For example, a tensile force in the first shaft 606 can be transferred to the release device 618 via the pin port 654, to the pin port 632 in the coupling 310, to the set of locking keys 612 via the groove 630, to the second shaft 608 via the key ports 664. Although the tensile force is described as originating with the first shaft 606, it is understood that the tensile force may be generated from the second shaft 608.

In some embodiments, the coupling assembly 600 can be released by exceeding the shear rating of the release device 618. The release device 618 can be designed to shear, e.g. to break into three pieces, when the tensile force applied from a first shaft to the opposite shaft exceeds a predetermined value. The release device 618 can be configured to allow for the disassembly of the coupling assembly 600. The breaking of the release device 618 can allow the coupling 610 to be removed from the first shaft 606.

Additional Disclosure

The following are non-limiting, specific embodiments in accordance and with the present disclosure:

A first embodiment, which is a pump assembly, comprising a first section including a first outer housing and a first drive shaft, wherein the first outer housing is generally cylindrical with an inner chamber, the first drive shaft is generally cylindrical with splines on an outer surface thereof and the first drive shaft has a first plunger bore; a second section including a second outer housing and a second drive shaft, wherein the second outer housing is generally cylindrical with an inner chamber, the second drive shaft is generally cylindrical with splines on an outer surface thereof and the second drive shaft has a second plunger bore; wherein the first outer housing of the first section is mechanically coupled to the second outer housing of the second section; a coupling assembly comprising a coupling, at least one first locking key, and at least one second locking key, wherein the coupling is generally cylindrical in shape with an outer surface and splines formed along an inner surface thereof, wherein the first locking key is installed within a first key port within the first plunger bore, and wherein the second locking key is installed within a second key port within the second plunger bore; a plunger assembly comprising a first plunger 370, a plunger spring 372, and a second plunger 374, wherein the first plunger 370 retains the first locking key 312A in a first groove 330A within the inner surface 322 of the coupling 310, wherein the second plunger 374 retains the second locking key 312B in a second groove within the inner surface of the coupling 330B, and wherein the plunger spring 372 is configured to retain the first plunger 370 and second plunger 374 in a second position; wherein the coupling assembly mechanically couples the first drive shaft and the second drive shaft; wherein the coupling is configured to transmit torque from the first drive shaft to the second drive shaft via the splines; and wherein the coupling assembly is configured to transfer tensile stress from the first key port 364A in the first drive shaft 306 to the first groove 330A in the coupling 310 via the first locking key 312A to the second key port 364B in the second drive shaft 308 by the second groove 330B in the coupling 310 via the second locking key 312B.

A second embodiment, which is the pump assembly of the first embodiment, wherein a first groove 330A on the inner surface 322 of the coupling 310 aligns with the first key port 364A of the first drive shaft 306 in response to an end surface 360A of the first drive shaft 306 contacting a coupling plate 350 coupled to the inner surface 322 of the coupling 310.

A third embodiment, which is the pump assembly of any of the first and the second embodiments, wherein the second groove 330B on the inner surface 322 of the coupling 310 aligns with the second key port 364B of the second drive shaft 308 in response to an end surface 360B of the second drive shaft 308 contacting a coupling plate 350 coupled to the inner surface 322 of the coupling 310.

A fourth embodiment, which is the pump assembly of any of the first through the third embodiments, wherein the first plunger 370 is configured to move the at least one first locking key 312A from a first position to a second position.

A fifth embodiment, which is the pump assembly of the first through the fourth embodiments, wherein the second plunger 374 is configured to move the at least one second locking key 312B from a first position to a second position.

A sixth embodiment, which is the pump assembly of any of the first through the fifth embodiments, wherein the plunger assembly 314 is configured to an expanded position.

A seventh embodiment, which is the pump assembly of any of the first through the sixth embodiment, wherein the first and second section comprise a pump section, an intake section, a seal section, a motor section, or combinations thereof.

A eighth embodiment, which is the pump assembly of any of the first through the seventh embodiments, wherein the pump assembly is a horizontal surface pump assembly or an electrical submersible pump assembly.

A ninth embodiment, which is the pump assembly of any of the first through the eighth embodiments, wherein the pump assembly produces fluid from a formation to a location at surface or injects fluid from a volume at surface into a formation.

A tenth embodiment, which is a coupling assembly adapted to couple a first shaft with a second shaft, the coupling assembly comprising a coupling cylindrical in shape with an outer surface and an inner surface, wherein a first groove within the inner surface of the coupling is formed radially proximate to a first end, and wherein a second groove within the inner surface of the coupling is formed radially proximate to the opposite end; a plunger bore extending axially into the first shaft; a plunger bore extending axially into the second shaft; at least one first locking key positioned in a first key port radially extending into the plunger bore on the first shaft; at least one second locking key positioned in a second key port radially extending into the plunger bore on the second shaft; a plunger assembly comprising a first plunger, a second plunger, and a plunger spring; wherein the first plunger of the plunger assembly retains the first locking key in the first groove within the inner surface of the coupling; wherein the second plunger retains the second locking key in the second groove within the inner surface of the coupling at an axial distance from the first groove within the inner surface of the coupling; and wherein the coupling assembly is configured to transfer tensile force from the first shaft to the second shaft via the first locking key in the first groove within the inner surface of the coupling and the second locking key in the second groove within the inner surface of the coupling.

An eleventh embodiment, which is the coupling assembly of the tenth embodiment, further comprising a set of splines formed longitudinally along an outer surface of the first shaft and an outer surface of the second shaft.

A twelfth embodiment, which is the coupling assembly of any of the tenth or the eleventh embodiments, wherein a set of spline formed longitudinally along the inner surface of the coupling is configured to rotationally couple the first shaft and the second shaft, and wherein the coupling is configured to transfer torque from the first shaft to the second shaft.

A thirteenth embodiment, which is the coupling assembly of any of the tenth through the twelfth embodiments, wherein the plunger assembly is configured to move from a first position to a second position in response to the second groove within the inner surface of the coupling aligning with the second key port of the second shaft.

A fourteenth embodiment, which is the coupling assembly of any of the tenth through the thirteenth embodiments, wherein the plunger assembly is configured to move from to a first position to a second position in response to the position of the second drive shaft with the second locking key in a first position within the second locking port.

A fifteenth embodiment, which is the coupling assembly of any of the tenth through the fourteenth embodiment, further comprising a coupling plate with a through hole installed within the inner surface of the coupling, and wherein the coupling plate is configured to transfer compression loading from the first shaft to the second shaft.

A sixteenth embodiment, which is a system, comprising a first section comprising a first housing and a first drive shaft; a second section comprising a second housing and a second drive shaft; wherein each of the first housing and the second housing is cylindrical in shape with an inner chamber, and wherein each of the first drive shaft and second drive shaft is cylindrical in shape with a plunger bore; wherein the first housing is configured to mechanically couple to the first housing, the second housing, or combinations thereof; a coupling assembly comprising a coupling, at least one first locking key, at least one second locking key, and a plunger assembly, wherein the coupling is cylindrical in shape with an outer surface and an inner surface, wherein the first locking key is positioned in a retracted position within a first key port radially intersecting with the plunger bore in the first drive shaft, wherein the second locking key is positioned in a retracted position within a second key port radially intersecting with the plunger bore in the second drive shaft, wherein the plunger assembly comprises a first plunger, a second plunger, and a plunger spring located between the first plunger and the second plunger, wherein the first plunger is configured to move the first locking key to an extended position in response to a first groove within the coupling aligning with the first key port, and wherein the second plunger is configured to move the second locking key to an extended position in response to the second groove within the coupling aligning with the second key port; and wherein the coupling assembly is configured to transfer a tensile load from the second drive shaft to the first drive shaft via the coupling, wherein the tensile load within the second drive shaft is transferred to the coupling by the second locking key positioned within the second groove in the coupling and the second key port in the second drive shaft, wherein the tensile load within the coupling is transferred to the first drive shaft by the first locking key positioned with the first groove in the coupling and the first key port in the first drive shaft.

A seventeenth embodiment, which is the system of the sixteenth embodiment, further comprising a thrust bearing mechanism comprising a dynamic bearing mechanically coupled to a drive shaft and a static bearing mechanically coupled to a housing of the first section or the second section.

A eighteenth embodiment, which is the system of the seventeenth embodiment, wherein the thrust bearing mechanism is configured to transfer the tensile load from the drive shaft to the static bearing coupled to the housing via the dynamic bearing coupled to the drive shaft.

A nineteenth embodiment, which is the system of the sixteenth through the eighteenth embodiments, further comprising a pump assembly comprising at least one of the first section and the second section, wherein the first and second sections are selected from a group consisting of a pump section, an intake section, and a motor section.

An twentieth embodiment, which is the system of the nineteenth embodiment, wherein the pump assembly is an injection pump or a production pump, and wherein the pump assembly is a horizontal production pump assembly or an electrical submersible pump assembly.

A twenty-first embodiment, which is a pump assembly, comprising a first section including a first outer housing and a first drive shaft, wherein the first outer housing is generally cylindrical with an inner chamber, the first drive shaft is generally cylindrical with splines on an outer surface thereof, a key port, and the first drive shaft has a plunger bore; a second section including a second outer housing and a second drive shaft, wherein the second outer housing is generally cylindrical with an inner chamber, the second drive shaft is generally cylindrical with splines on an outer surface thereof and a pin port; wherein the first outer housing of the first section is mechanically coupled to the second outer housing of the second section; a coupling assembly comprising a coupling, at least one locking key, a support ring, and a release device, wherein the coupling is generally cylindrical in shape with an outer surface, a support groove, and splines formed along an inner surface thereof, wherein the support ring is generally cylindrical in shape with a plunger bore and coupled to the support groove, wherein the locking key is installed within the key port of the first drive shaft, and wherein the release device is coupled to a pin port in the coupling and the pin port in the second drive shaft; a plunger assembly comprising a plunger and a plunger spring, wherein the plunger and plunger spring is slidingly engaged with the plunger bore of the support ring, and wherein the plunger retains the at least one locking key in a groove in the coupling, and wherein the plunger spring is configured to retain the plunger in a second position; wherein the coupling assembly mechanically couples the first drive shaft and the second drive shaft; wherein the coupling is configured to transmit torque from the first drive shaft to the second drive shaft via the splines; and wherein the coupling assembly is configured to transfer tensile stress from the pin port in the second drive shaft to the pin port in the coupling via the release device to the key port in the first drive shaft by the groove in the coupling via the locking key.

A twenty-second embodiment which is the pump assembly of the twenty-first embodiment, wherein the groove on the inner surface of the coupling aligns with the key port of the second drive shaft in response to an end surface of the second drive shaft abutting the support ring.

A twenty-third embodiment which is the pump assembly of the twenty-first embodiment, wherein the plunger is configured to move the at least one locking key from a first position to a second position.

A twenty-fourth embodiment which is the pump assembly of the twenty-first embodiment, wherein the plunger assembly is configured to move from a contracted position to an expanded position.

A twenty-fifth embodiment which is the pump assembly of the twenty-first embodiment, wherein the release device is configured to break at a predetermined tensile force.

A twenty-sixth embodiment which is the pump assembly of the twenty-first embodiment, wherein the first and second section are selected from a group consisting of a pump section, an intake section, a seal section, and a motor section.

A twenty-seventh embodiment which is the pump assembly of the twenty-first embodiment, wherein the pump assembly is a horizontal surface pump or an electrical submersible pump assembly.

A twenty-eighth embodiment which is the pump assembly of the twenty-seventh embodiment, wherein the pump assembly produces fluid from a formation to a location at surface or injects fluid from a volume at surface into a formation.

A twenty-ninth embodiment which is the pump assembly of the sixth embodiment, wherein the pump assembly is an ESP assembly comprising at least one pump section, at least one intake section, at least one seal section, and at least one motor section, wherein the pump section comprises a centrifugal pump, a progressive cavity pump, a piston pump, a rod pump, a turbine assembly, or combinations thereof, and wherein the motor section is an electrical motor or an electrical generator.

A thirtieth embodiment which is the pump assembly of the twenty-ninth embodiment, wherein the ESP assembly further comprises i) a first coupling assembly between the pump section and intake section, ii) a second coupling assembly between the intake section and the seal section, iii) a third coupling assembly between the seal section and the motor section, or iv) any combination thereof.

A thirty-first embodiment which is the pump assembly of the twenty-ninth embodiment, wherein the at least one pump section is uphole of the motor section.

A thirty-second embodiment which is the pump assembly of the twenty-ninth embodiment, wherein the at least one motor section is uphole of the pump section.

A thirty-third embodiment which is the pump assembly of the sixth embodiment, wherein the pump assembly is a horizontal surface pump assembly comprising at least one motor section, at least one seal section, at least one inlet section, at least one pump section, and wherein the pump section comprises a centrifugal pump, a progressive cavity pump, a piston pump, a rod pump, a turbine pump, or combinations thereof.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A pump assembly, comprising:
    a first section including a first outer housing and a first drive shaft, wherein the first outer housing is cylindrical with an inner chamber and the first drive shaft is cylindrical with splines on an outer surface thereof, a key port, and a plunger bore;
    a second section including a second outer housing and a second drive shaft, wherein the second outer housing is cylindrical with an inner chamber and the second drive shaft is cylindrical with splines on an outer surface thereof and a pin port;
    wherein the first outer housing of the first section is mechanically coupled to the second outer housing of the second section;
    a coupling assembly comprising a coupling, a locking key, a support ring, and a release device, wherein the coupling is generally cylindrical in shape with an outer surface, a support groove, and splines formed along an inner surface thereof, wherein the support ring is cylindrical in shape with a plunger bore and coupled to the support groove, wherein the locking key is installed within the key port of the first drive shaft, and wherein the release device is coupled to a pin port in the coupling and the pin port in the second drive shaft;
    a plunger assembly comprising a plunger and a plunger spring, wherein the plunger and plunger spring are slidingly engaged with the plunger bore of the support ring, and wherein the plunger retains the locking key in a locked position in a groove within the inner surface of the coupling, and wherein the plunger spring is configured to urge the plunger to drive the locking key into the locked position in the groove within the inner surface of the coupling during assembly of the pump assembly;
    wherein the coupling assembly mechanically couples the first drive shaft and the second drive shaft;
    wherein the coupling is configured to transmit torque from the first drive shaft to the second drive shaft via the splines of the first drive shaft, the splines of the second drive shaft, and the splines of the coupling; and
    wherein the coupling assembly is configured to transfer tensile stress from the pin port in the second drive shaft to the pin port in the coupling via the release device and from the coupling to the key port in the first drive shaft by the groove in the coupling via the locking key.

2. The pump assembly of claim 1, wherein the groove on the inner surface of the coupling aligns with the key port of the first drive shaft in response to an end surface of the first drive shaft abutting the support ring.

3. The pump assembly of claim 1, wherein the plunger is configured to move the locking key from a first position to a second position.

4. The pump assembly of claim 1, wherein the plunger assembly is configured to move from a contracted position to an expanded position.

5. The pump assembly of claim 1, wherein the release device is configured to break at a predetermined tensile force.

6. The pump assembly of claim 1, wherein the first and second section are selected from a group consisting of a pump section, an intake section, a seal section, and a motor section.

7. The pump assembly of claim 6, wherein the pump assembly is an ESP assembly comprising at least one pump section, at least one intake section, at least one seal section, and at least one motor section, wherein the pump section comprises a centrifugal pump, a progressive cavity pump, a piston pump, a rod pump, a turbine assembly, or combinations thereof, and wherein the motor section is an electrical motor or an electrical generator.

8. The pump assembly of claim 1, wherein the pump assembly is a horizontal surface pump assembly or an electrical submersible pump assembly.

9. A coupling assembly adapted to couple a first shaft with a second shaft, the coupling comprising:
    a coupling cylindrical in shape with an outer surface and an inner surface, wherein a groove is formed radially within the inner surface of the coupling and wherein a pin port is defined by the coupling;
    a plunger bore extending axially into the first shaft;
    a locking key positioned in a key port disposed in the first drive shaft, wherein the key port extends radially into the plunger bore;

a plunger assembly comprising a plunger and a plunger spring;

wherein the plunger of the plunger assembly retains the locking key in the groove within the inner surface of the coupling;

a release device coupled to the pin port in the coupling and to a pin port defined in the second drive shaft; and wherein the coupling assembly is configured to transfer tensile force from the first shaft to the second shaft via the locking key in the groove within the inner surface of the coupling and the release device in the pin port in the coupling and the pin port defined in the second drive shaft.

10. The coupling assembly of claim 9, wherein the groove on the inner surface of the coupling aligns with the key port of the first drive shaft in response to an end surface of the first drive shaft abutting a support ring of the coupling assembly.

11. The coupling assembly of claim 9, wherein the plunger is configured to move the locking key from a first position to a second position.

12. The coupling assembly of claim 9, wherein the plunger assembly is configured to move from a contracted position to an expanded position.

13. The coupling assembly of claim 9, wherein the release device is configured to break at a predetermined tensile force.

14. The pump coupling assembly of claim 13, wherein the release device is a threaded screw.

15. The pump coupling assembly of claim 13, wherein the release device is a rolled pin.

16. An electric submersible pump (ESP) assembly, comprising:

a first section including a first outer housing and a first drive shaft, wherein the first outer housing is cylindrical with an inner chamber and the first drive shaft is cylindrical with splines on an outer surface thereof, a key port, and a plunger bore;

a second section including a second outer housing and a second drive shaft, wherein the second outer housing is cylindrical with an inner chamber and the second drive shaft is cylindrical with splines on an outer surface thereof and a pin port;

wherein the first outer housing of the first section is mechanically coupled to the second outer housing of the second section;

a coupling assembly comprising a coupling, a locking key, a support ring, and a release device, wherein the coupling is generally cylindrical in shape with an outer surface, a support groove, and splines formed along an inner surface thereof, wherein the support ring is cylindrical in shape with a plunger bore and coupled to the support groove, wherein the locking key is installed within the key port of the first drive shaft, and wherein the release device is coupled to a pin port in the coupling and the pin port in the second drive shaft;

a plunger assembly comprising a plunger and a plunger spring, wherein the plunger and plunger spring are slidingly engaged with the plunger bore of the support ring, and wherein the plunger retains the locking key in a locked position in a groove within the inner surface of the coupling, and wherein the plunger spring is configured to urge the plunger to drive the locking key into the locked position in the groove within the inner surface of the coupling during assembly of the pump assembly;

wherein the coupling assembly mechanically couples the first drive shaft and the second drive shaft;

wherein the coupling is configured to transmit torque from the first drive shaft to the second drive shaft via the splines of the first drive shaft, the splines of the second drive shaft, and the splines of the coupling; and wherein the coupling assembly is configured to transfer tensile stress from the pin port in the second drive shaft to the pin port in the coupling via the release device and from the coupling to the key port in the first drive shaft by the groove in the coupling via the locking key.

17. The ESP assembly of claim 16, wherein the groove on the inner surface of the coupling aligns with the key port of the first drive shaft in response to an end surface of the first drive shaft abutting the support ring.

18. The ESP assembly of claim 16, wherein the plunger is configured to move the locking key from a first position to a second position.

19. The ESP assembly of claim 16, wherein the plunger assembly is configured to move from a contracted position to an expanded position.

20. The ESP assembly of claim 16, wherein the first and second section are selected from a group consisting of a pump section, an intake section, a seal section, and a motor section.

* * * * *